United States Patent [19]

Iizuka

[11] Patent Number: 5,249,483
[45] Date of Patent: Oct. 5, 1993

[54] SELECT SHOCK REDUCING DEVICE OF AUTOMOTIVE AUTOMATIC TRANSMISSION

[75] Inventor: Naonori Iizuka, Shizuoka, Japan

[73] Assignee: JATCO Corporation, Fuji, Japan

[21] Appl. No.: 969,072

[22] Filed: Oct. 30, 1992

[30] Foreign Application Priority Data

Nov. 1, 1991 [JP] Japan .................. 3-315526

[51] Int. Cl.$^5$ .............................................. F16H 61/06
[52] U.S. Cl. ............................................... 74/866
[58] Field of Search ..................................... 74/866

[56] References Cited

U.S. PATENT DOCUMENTS

| | | | |
|---|---|---|---|
| 3,707,891 | 1/1973 | Asamo et al. | 74/869 |
| 3,738,182 | 6/1973 | Kubo et al. | 74/866 |
| 3,908,485 | 9/1975 | Miyauchi et al. | 74/867 |
| 4,346,626 | 8/1982 | Kawamoto | 74/866 |
| 4,580,466 | 4/1986 | Iwamaga | 74/869 X |
| 4,616,531 | 10/1986 | Ogasawara et al. | 74/866 |
| 4,628,774 | 12/1986 | Iwamaga | 74/867 |
| 4,631,982 | 12/1986 | Miki et al. | 74/869 |
| 4,730,521 | 3/1988 | Hayasaki et al. | 74/867 |
| 4,748,870 | 6/1988 | Sugino et al. | 74/866 |
| 4,807,496 | 2/1989 | Hayasaki et al. | 74/866 |
| 4,982,622 | 1/1991 | Yamamoto et al. | 74/866 |
| 5,005,444 | 4/1991 | Kimura et al. | 74/868 |
| 5,090,270 | 2/1992 | Suzuki | 74/866 |
| 5,107,723 | 4/1992 | Yamashita et al. | 74/866 |

FOREIGN PATENT DOCUMENTS 63-251652 10/1988 Japan .
01-105050 4/1989 Japan .

*Primary Examiner*—Dirk Wright
*Attorney, Agent, or Firm*—Foley & Lardner

[57] ABSTRACT

In order to reduce a select shock of an automatic transmission, a measure is employed, which comprises a first device for detecting the selection of a drive range from a neutral range; a second device for detecting the starting of engaging movement of a hydraulically operated friction element for the drive range; a third device for controlling a hydraulic pressure applied to the friction element; a fourth device for causing the third device to raise the hydraulic pressure to a higher level from the time when the range selection is carried out to the time when the second device detects the starting of engaging movement and lower the hydraulic pressure to a lower level after the detection by the second device; a fifth device for producing an instruction signal when a predetermined time passes after the drive range detection by the first device; and a sixth device for causing the third device to lower the hydraulic pressure to the lower level upon issuance of the instruction signal irrespective of any detection by the second device.

8 Claims, 5 Drawing Sheets

FIG.2

| | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|
| D-RANGE 1'ST SPEED | | | O | | | | O | O | $\dfrac{1+\alpha_2}{\alpha_2}$ | 3.027 |
| D-RANGE 2'ND SPEED | | O | O | | O | | O | | $\dfrac{\alpha_1+\alpha_2+\alpha_1\cdot\alpha_2}{\alpha_2(1+\alpha_1)}$ | 1.619 |
| D-RANGE 3'RD SPEED | | O | O | O | | | O | | 1 | 1.000 |
| D-RANGE 4'TH SPEED | | | (O) | O | O | | | | $\dfrac{1}{1+\alpha_1}$ | 0.694 |
| ENGINE BRAKING 1'ST SPEED | | | (O) | O | | O | (O) | (O) | | |
| ENGINE BRAKING 2'ND SPEED | | O | (O) | O | | | (O) | | | |
| ENGINE BRAKING 3'RD SPEED | | O | (O) | | | | (O) | | | |
| ENGINE BRAKING 4'TH SPEED | | | (O) | | O | | | | | |
| REVERSE | O | | | | | O | | | $-\dfrac{1}{\alpha_1}$ | -2.272 |

SELECT SHOCK REDUCING DEVICE OF AUTOMOTIVE AUTOMATIC TRANSMISSION

BACKGROUND OF THE INVENTION

1. Field of the Invention

The present invention relates in general to automotive automatic transmissions, and more particularly to a device for reducing a select shock of the automatic transmissions.

2. Description of the Prior Art

In order to clarify the task of the present invention, one conventional select shock reducing device for the automatic transmission will be described, which is disclosed in Japanese Patent First Provisional Publication 1-105050.

The select shock reducing device of this publication comprises generally an accumulator which controls ON/OFF operation of friction elements which are essential to all forward speeds and a reverse, a sensor means which detects starting of engaging movement of the friction elements, and a control means which raises the back pressure of the accumulator for a period from the time when a new range is selected by the transmission select lever to the time when the sensor means detects the starting of engaging movement of the friction elements. That is, when the transmission select lever is moved from neutral to a range which will produce a forward speed, the control means increases the back pressure of the accumulator to raise hydraulic pressure applied to the friction elements. With this, the starting of the engaging movement of the friction elements is quickly carried out. When thereafter the sensor means detects the starting of engaging movement of the friction elements, the control means reduces the back pressure of the accumulator to a normal level. With this, the accumulator can gently increase the hydraulic pressure applied to the friction elements.

However, this conventional select shock reducing device has no measure against a trouble of the sensor means. That is, when the sensor means gets out of order, the starting of engaging movement of the friction elements can not be detected, and thus, the hydraulic pressure applied to the friction elements can not be reduced to the normal level even when the engaging movement of the friction elements starts. Thus, under such condition, the select shock is deteriorated.

The sensor means employed in the select shock reducing device of the publication is constructed to find the starting of the engaging movement of the friction elements by detecting a reduction in rotation speed of the turbine of the associated torque converter. Thus, when the movement of the transmission select lever does not induce a marked speed reduction of the turbine like in the selection during cruising of the vehicle, it is impossible to sense the starting of the engaging movement of the friction elements.

SUMMARY OF THE INVENTION

It is therefore an object of the present invention to provide a select shock reducing device of automotive automatic transmission, which is free of the above-mentioned drawbacks.

According to the present invention, there is provided a select shock reducing device of an automotive automatic transmission, which comprises first means for detecting the selection of a drive range from a neutral range; second means for detecting the starting of engaging movement of a hydraulically operated friction element for the drive range; third means for controlling a hydraulic pressure applied to the friction element; fourth means for causing the third means to raise the hydraulic pressure to a higher level from the time when the range selection is carried out to the time when the second means detects the starting of engaging movement and lower the hydraulic pressure to a lower level after the detection by the second means; fifth means for producing an instruction signal when a predetermined time passes after the drive range detection by the first means; and sixth means for causing the third means to lower the hydraulic pressure to the lower level upon issuance of the instruction signal irrespective of any detection by the second means.

BRIEF DESCRIPTION OF THE DRAWINGS

Other objects and advantages of the present invention will become apparent from the following description when taken in conjunction with the accompanying drawings, in which:

FIG. 2 is a TABLE showing ON/OFF conditions of various friction elements of the automatic transmission with respect to speeds selected by the transmission;

DETAILED DESCRIPTION OF THE INVENTION

Figure 1:
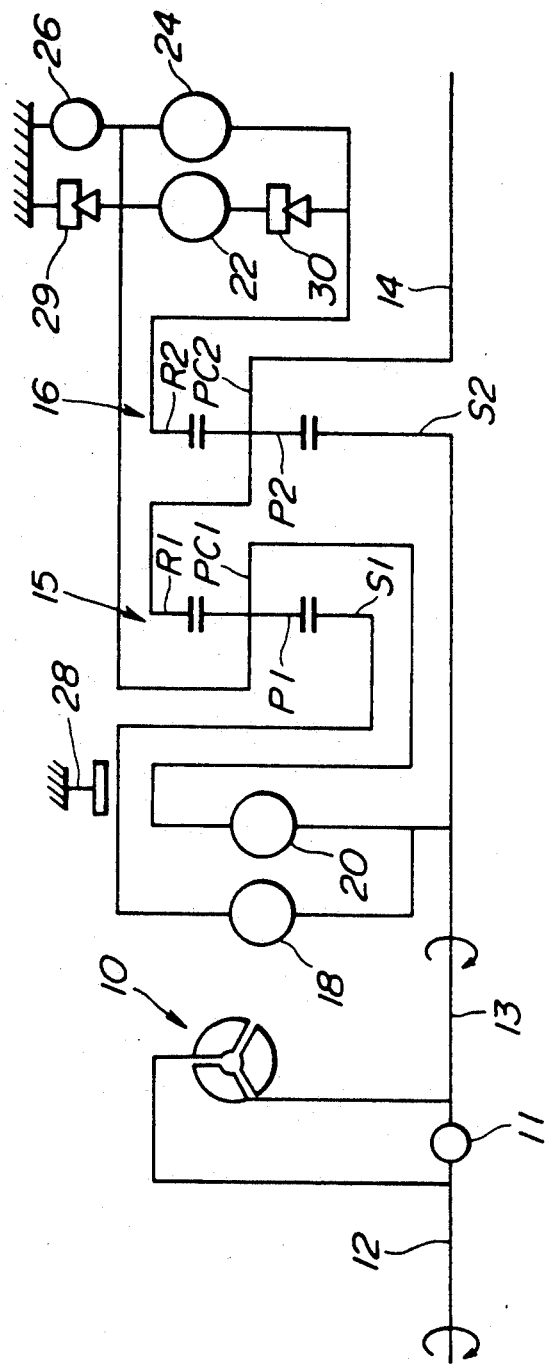
FIG. 1 is a schematic illustration of an automotive automatic transmission to which the present invention is applied.

Referring to the drawings, there is shown an embodiment of the present invention.

In FIG. 1, there is schematically shown an automotive automatic transmission of a type having an overdrive, four forward speeds and one reverse.

The transmission comprises an input shaft 13 to which a torque of an engine output shaft 12 is transmitted through a torque converter 10. Designated by numeral 14 is an output shaft of the transmission through which a driving force is fed to a final drive device (not shown). Between the input and output shafts 13 and 14, there are disposed, in the illustrated manner, a first planetary gear unit 15, a second planetary gear unit 16, a reverse clutch 18, a high clutch 20, a forward clutch 22, an overrunning clutch 24, a low-and-reverse brake 26, a band brake 28, a low-oneway clutch 29 and a forward-oneway clutch 30.

When the forward clutch 22 is engaged, the transmission is ready for effecting a forward speed, and when the reverse clutch 18 and the low-and-reverse brake 26 are engaged, the transmission is ready for effecting a reverse. The forward clutch 22, the reverse clutch 18 and the low-and-reverse brake 26 constitute so-called "friction elements" which are essential to all forward speeds and a reverse.

The torque converter 10 has a lock-up clutch 11 installed therein.

The first planetary gear unit 15 comprises a sun gear S1, an internal gear R1, pinion gears P1 each meshing with both the sun gear S1 and the internal gear R1, and a pinion gear carrier PC1 carrying the pinion gears P1.

The pinion gear carrier PC1 is connectable to the input shaft 13 through the high clutch 20, and the sun gear S1 is connectable to the input shaft 13 through the reverse clutch 18.

The second planetary gear unit 16 comprises a sun gear S2, an internal gear R2, pinion gears P2 each meshing with both the sun gear S2 and the internal gear R2, and a pinion gear carrier PC2 carrying the pinion gears P2.

The pinion gear carrier PC1 of the first planetary gear unit 15 is connectable to the internal gear R2 of the second planetary gear unit 16 through the forward clutch 22 and the forward-oneway clutch 30 which are connected in tandem or through the overrunning clutch 24 which is arranged in parallel with the tandem connected clutches 22 and 30.

The sun gear R2 of the second planetary gear unit 16 is constantly connected with the input shaft 13, and the internal gear R1 of the first planetary gear unit 15 and the pinion gear carrier PC2 of the second planetary gear unit 16 are constantly connected with the output shaft 14.

The low-and-reverse brake 26 can fix the pinion gear carrier PC1 of the first planetary gear unit 15 and the band brake 28 can fix the sun gear S1 of the first planetary gear unit 15.

The low-oneway clutch 29 is so arranged as to permit only a normal rotation (viz., the rotation in the same direction as the engine output shaft 12) of the pinion gear carrier PC1 of the first planetary gear unit 15. That is, a reversed rotation of the pinion gear carrier PC1 is suppressed by the clutch 29.

By selectively engaging and disengaging the clutches 18, 20, 22, 24, 29 and 30 and the brakes 26 and 28 in various combinations, the elements (viz., S1, S2, R1, R2, PC1 and PC2) of the first and second planetary gear units 15 and 16 are forced to change their operating conditions. With this changing, the ratio of rotation speed of the output shaft 14 relative to that of the input shaft 13 can be variously changed.

FIG. 2 is a table showing the various gear speeds (viz., first, second, third and fourth forward speeds and a reverse) which are given by the ON/OFF conditions of the clutches 18, 20, 22, 24, 29 and 30 and the brakes 26 and 28.

In the table, the mark "O" means "ON" or engaged condition of the associated clutch or brake and "blank" means "OFF" or disengaged condition of the same. The mark "(O)" means engaged condition of an associated clutch or brake. However, this engaged condition does not participate in power transmission in the established gear speed. It is to be noted "a1" or "a2" is a ratio of the number of teeth of the sun gear S1 or S2 relative to that of the internal gear R1 or R2, and the "GEAR RATIO" is the ratio of the rotation speed of the input shaft 13 relative to that of the output shaft 14.

Figure 3:
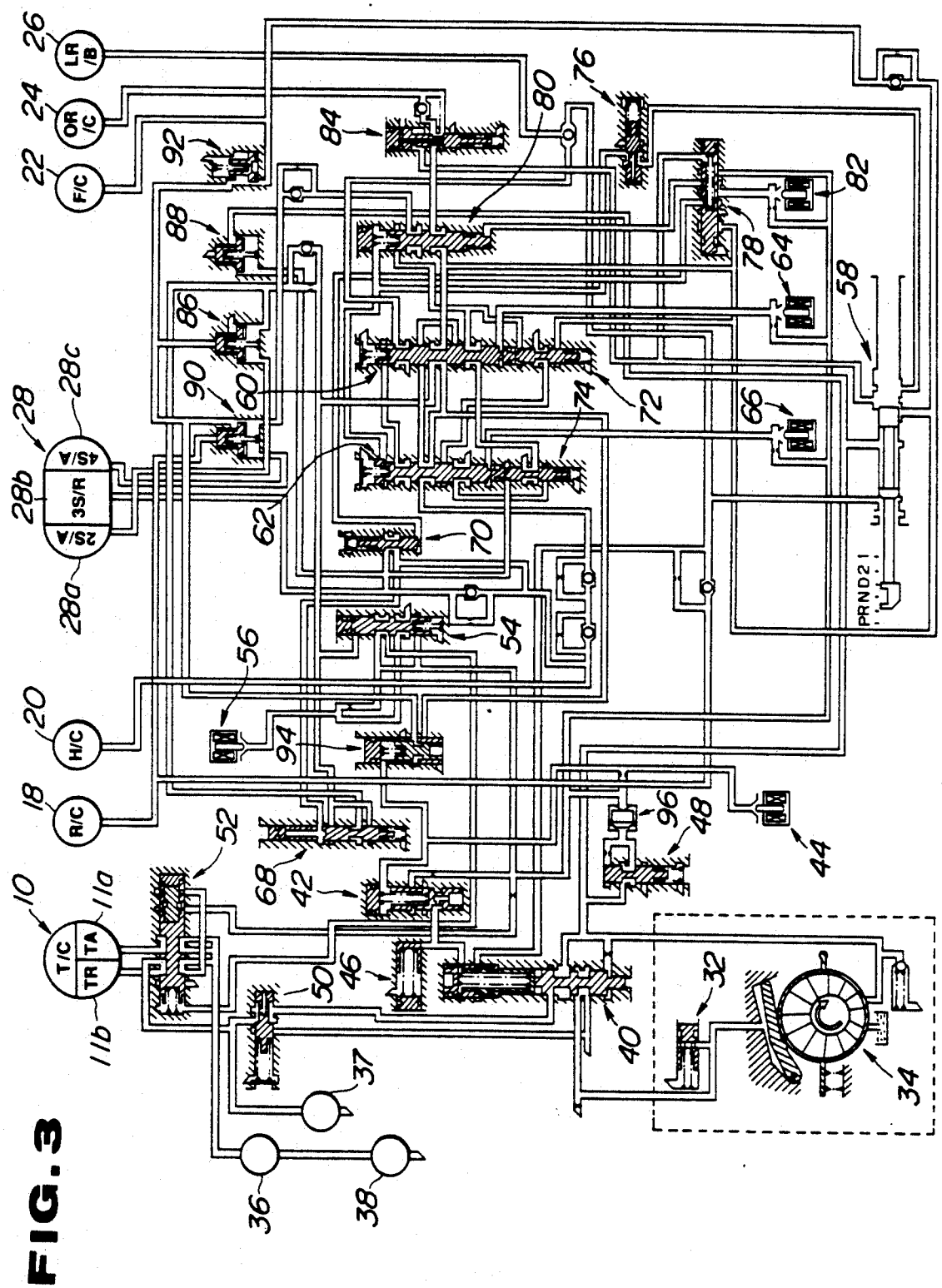
FIG. 3 is a hydraulic circuit of the automatic transmission.

FIG. 3 shows a hydraulic control circuit for controlling operation of the above-mentioned automatic transmission. The control circuit comprises a line pressure control valve 40, a pressure modifier valve 42, a line pressure control solenoid 44 (viz., control means for controlling hydraulic pressure applied to the "friction elements"), a modified pressure accumulator 46, a pilot valve 48, a torque converter relief valve 50, a lock-up control valve 52, a first shuttle valve 54, a lock-up control solenoid 56, a manual valve 58, a first shift valve 60, a second shift valve 62, a first shift solenoid 64, a second shift solenoid 66, a servo-charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid (viz., engine brake controlling solenoid) 82, an overrunning clutch reducing valve 84, a 1-2 accumulator 86, a 2-3 accumulator 88, a 3-4 accumulator 90, a N-D accumulator 92, an accumulator control valve 94 and a filter 96. These elements are connected in such a manner as is shown in the drawing.

The torque converter 10 has therein pressure apply and release chambers 11a and 11b for the lock-up clutch 11. This torque converter 10, the forward clutch 22, the high clutch 20, the band brake 28, the reverse clutch 18, the low-and-reverse brake 26 and the overrunning clutch 24 are connected to the hydraulic control circuit in the illustrated manner. The band brake 28 has a pressure apply chamber 28a for the second speed, a pressure release chamber 28b for the third speed and a pressure apply chamber 28c for the fourth speed incorporated therewith.

An oil pump 34 of capacity variable vane type, an oil cooler 36, a front lubrication circuit 37 and a rear lubrication circuit 38 are connected in the illustrated manner. The oil pump 34 is equipped with a feedback accumulator 32.

The hydraulic control circuit of this type is described in detail in Japanese Patent First Provisional Publication No. 63-251652.

Figure 4:
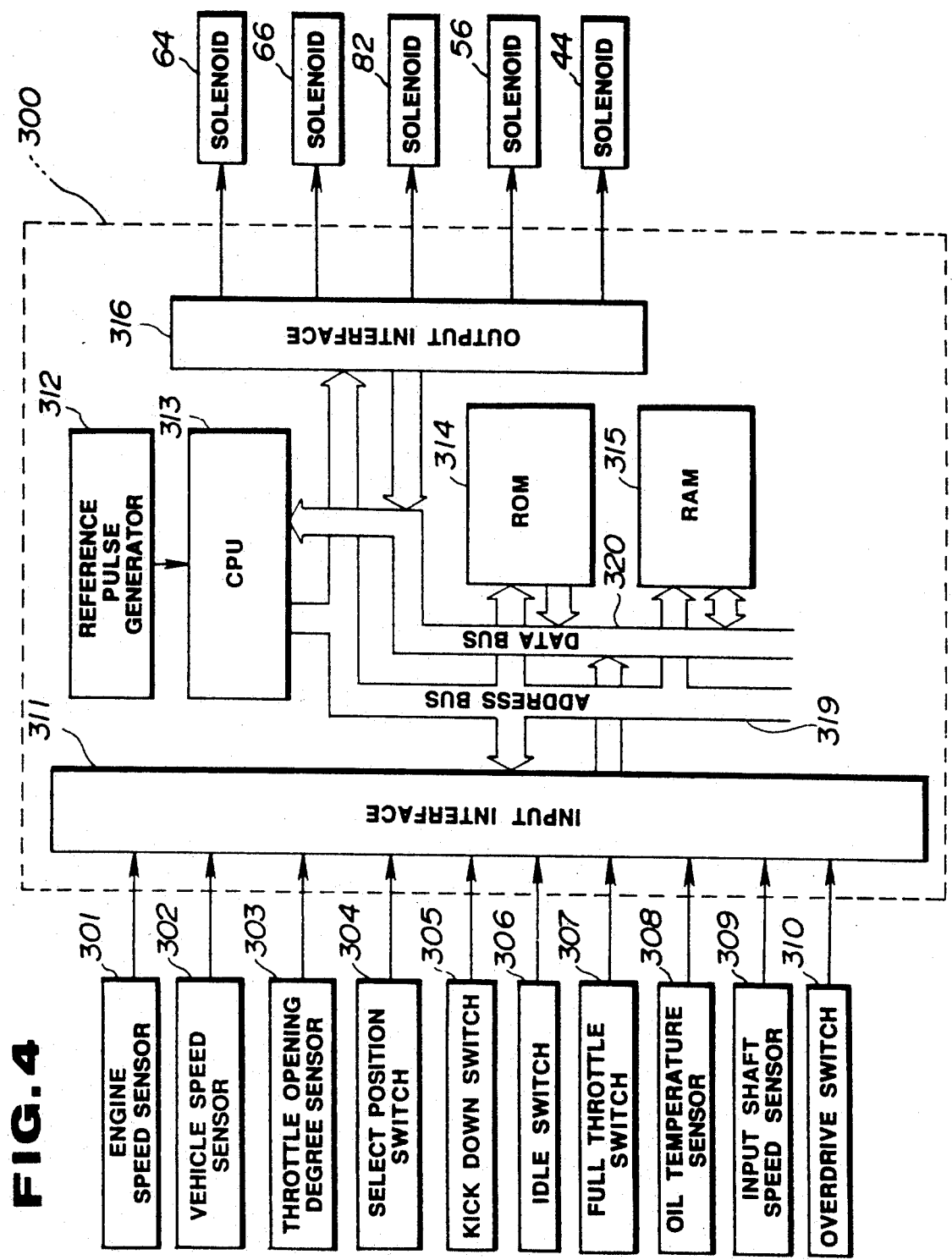
FIG. 4 is a schematic view of a control unit for controlling the transmission.

FIG. 4 shows schematically a control unit 300 which controls the operation of the solenoids 44, 56, 64, 66 and 82. As shown, the control unit 300 comprises an input interface 311, a reference pulse generator 312, a central processing unit (CPU) 313, a read only memory (ROM) 314, a random access memory (RAM) 315 and an output interface 316, an address bus 319 and a data bus 320.

Information signals from an engine speed sensor 301, a vehicle speed sensor 302, a throttle valve opening degree sensor 303, a select position switch 304 (viz., select range detecting means), a kick down switch 305, an idle switch 306, a full throttle switch 307, an oil temperature switch 308, an input shaft speed sensor 309 for detecting the rotation speed of the turbine of the torque converter and an over-drive switch 310 are fed to the input interface 311 of the control unit 300.

Figure 5:
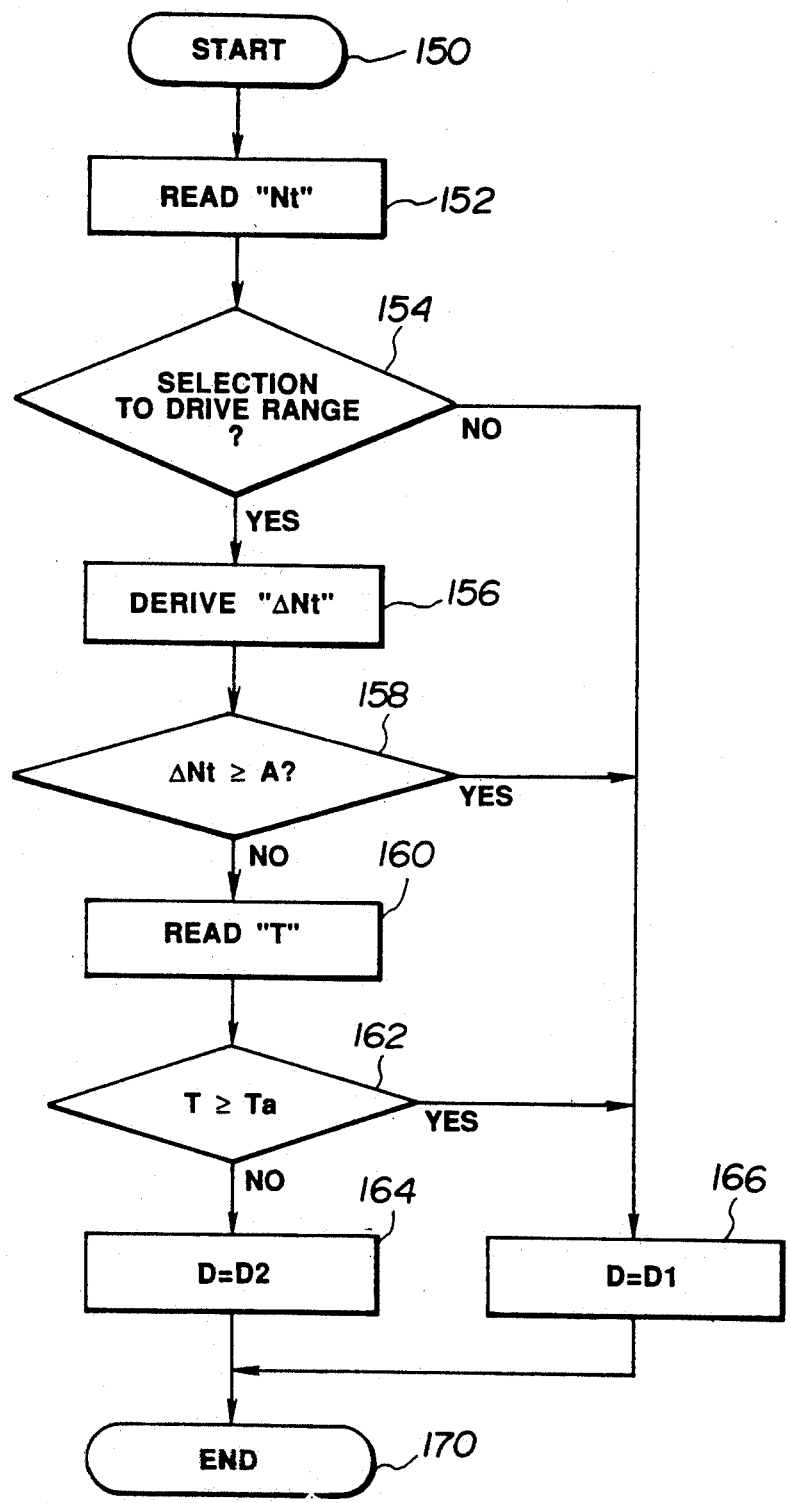
FIG. 5 is a flowchart showing operation steps carried out in a computer of the control unit.

The controlled operation of the select shock reducing device of the present invention is carried out in such a manner as is depicted in the flowchart of FIG. 5.

That is, at step 152, the rotation speed "Nt" of the turbine of the torque converter 10, which is sensed by the input shaft speed sensor 309, is read. Then, at step 154, a judgement is carried out as to whether or not the transmission select lever has been moved from neutral (viz., "Neutral" position or "Parking" position) to a range for producing a forward speed. If "No", that is, when the select lever has not been moved to such range, the routine flows to step 166 wherein the drive duty ratio "D" of the line pressure control solenoid 44 is set to a predetermined value "D1" and then the routine flows to step 170 to finish the control. While, if "Yes" at step 154, that is, if the select lever has been moved to such range, the routine flows to step 156 wherein the change rate "ΔNt" of the rotation speed "Nt" is calculated. Then, the routine flows to step 158 wherein a judgement is carried out whether or not the change rate "ΔNt" is equal to or greater than a predetermined value "A". If "Yes", the routine flows to the above-mentioned step 166. While, if "No", that is, if the change rate "ΔNt" is smaller than the predetermined value "A", the routine flows to step 160 wherein the time "T" taken from the time when the select lever has come to the new range is read. The routine then flows to step 162 wherein a judgement is carried out as to whether or not the elapsed time "T" is equal to or greater than a predetermined value "Ta". If "Yes", the routine flows to the step 166. While, if "No", that is, if the elapsed time "T" is smaller than the predetermined value "Ta", the routine flows to step 164 wherein the drive duty ratio "D" is set to another predetermined value "D2", and the control is finished at step 170.

It is to be noted that when the drive duty ratio "D" is "D1", the line pressure, that is, hydraulic pressure applied to the forward clutch 22 exhibits a lower level, while, when the drive duty ratio "D" is "D2", the hydraulic pressure exhibits a higher level. That is, the accumulator control valve 94 is controlled by the line pressure which is adjusted by the line pressure control solenoid 44, and the hydraulic pressure obtained by this control is applied to the N-D accumulator 92 as a back pressure. In accordance with this back pressure, the degree of the hydraulic pressure applied to the forward clutch 22 is determined.

In the transmission, the following operation is practically carried out in accordance with the above-mentioned control flow.

When the transmission select lever is moved from a neutral range (for example, "N" range) to a forward speed range (for example, "D" range), this movement is sensed by the select position switch 304 and a timer is set running. At the same time, the control unit 300 issues an instruction signal to the line pressure control solenoid 44 for raising the hydraulic pressure, which is applied to the forward clutch 22, to the predetermined higher level. When the time predetermined by the timer elapses, or when the rotation speed of the torque converter turbine is lower than a predetermined value, the control unit 300 issues an instruction signal to the solenoid 44 to lower the hydraulic pressure of the forward clutch 22 to the predetermined lower level. That is, upon issuance of either a signal representing expiration of the time predetermined by the timer or another signal representing reduction in rotation speed of the torque converter turbine, the hydraulic pressure applied to the forward clutch 22 is controlled from the higher level to the lower or normal level. Accordingly, even when the speed sensor 309 can not detect the speed reduction of the torque converter turbine due to its failure or the like, the needed reduction in hydraulic pressure applied to the forward clutch 22 is assuredly carried out by the timer. Thus, the undesirable select shock is assuredly eliminated or at least minimized.

Since the temperature of the hydraulic oil, the vehicle speed, and the engine load tend to affect the engaging timing of the forward clutch 22, the predetermined time set by the timer may be changed in accordance with at least of them.

What is claimed is:

1. A select shock reducing device of an automotive automatic transmission comprising:

first means for detecting the selection of a drive range from a neutral range;

second means for detecting the starting of engaging movement of a hydraulically operated friction element for the drive range;

third means for controlling a hydraulic pressure applied to said friction element;

fourth means for causing said third means to raise said hydraulic pressure to a higher level from the time when said range selection is carried out to the time when said second means detects said starting of engaging movement and lower said hydraulic pressure to a lower level after the detection by said second means; and fifth means for producing an instruction signal when a predetermined time passes after the drive range detection by said first means; and sixth means for causing said third means to lower said hydraulic pressure to said lower level upon issuance of said instruction signal irrespective of any detection by said second means.

2. A select shock reducing device as claimed in claim 1, in which said predetermined time is varied in accordance with at least one of the temperature of hydraulic fluid of the transmission, the vehicle speed at the time when the range selection is carried out and the engine load at the time when the range selection is carried out.

3. A select shock reducing device as claimed in claim 1, in which said first means is a select position switch which issues a signal when a select lever is shifted from a neutral position to a forward speed position.

4. A select shock reducing device as claimed in claim 1, in which said second means uses an information signal produced by an input shaft speed sensor by which the rotation speed of the turbine of an associated torque converter is sensed.

5. A select shock reducing device as claimed in claim 4, in which said second means detects the starting of engaging movement of the friction element by sensing a speed down of said turbine.

6. A select shock reducing device as claimed in claim 1, in which said third means is a line pressure control solenoid which controls the line pressure of the transmission.

7. A select shock reducing device as claimed in claim 1, in which said fifth means is a timer installed in a computer.

8. A select shock reducing device as claimed in claim 1, in which said hydraulically operated friction element is a forward clutch.

* * * * *